(12) United States Patent
Berlandier et al.

(10) Patent No.: US 10,540,628 B2
(45) Date of Patent: Jan. 21, 2020

(54) HIERARCHICAL BUSINESS RULE MODEL

(71) Applicant: International Business Machines Corporation, Armonk, NY (US)

(72) Inventors: Pierre C. Berlandier, San Diego, CA (US); Jerome R. L. Boyer, Santa Clara, CA (US)

(73) Assignee: International Business Machines Corporation, Armonk, NY (US)

(*) Notice: Subject to any disclaimer, the term of this patent is extended or adjusted under 35 U.S.C. 154(b) by 1161 days.

(21) Appl. No.: 14/857,151

(22) Filed: Sep. 17, 2015

(65) Prior Publication Data

US 2017/0083837 A1    Mar. 23, 2017

(51) Int. Cl.
    G06Q 10/06      (2012.01)
    G06F 16/2455    (2019.01)
    G06F 16/36      (2019.01)

(52) U.S. Cl.
    CPC ..... *G06Q 10/067* (2013.01); *G06F 16/24564* (2019.01); *G06F 16/367* (2019.01)

(58) Field of Classification Search
    CPC ............ G06Q 10/067; G06F 16/24564; G06F 16/367; G06F 17/30734; G06F 17/30507
    See application file for complete search history.

(56) References Cited

U.S. PATENT DOCUMENTS

| | | | |
|---|---|---|---|
| 5,809,492 A * | 9/1998 | Murray | G06N 5/022 706/45 |
| 8,073,814 B2 | 12/2011 | Cosby et al. | |
| 8,712,949 B2 | 4/2014 | Proctor et al. | |
| 2002/0120917 A1* | 8/2002 | Abrari | G06F 8/10 717/110 |
| 2003/0115484 A1* | 6/2003 | Moriconi | G02B 6/132 726/1 |
| 2004/0034848 A1* | 2/2004 | Moore | G06N 5/047 717/117 |
| 2004/0117765 A1* | 6/2004 | Chan | G06N 5/04 717/117 |
| 2005/0111467 A1* | 5/2005 | Ng | H04L 29/06 370/401 |
| 2007/0282986 A1 | 12/2007 | Childress et al. | |
| 2008/0109458 A1* | 5/2008 | Cosby | G06Q 10/10 |

(Continued)

FOREIGN PATENT DOCUMENTS

WO    2010120713 A1    10/2010

OTHER PUBLICATIONS

An Object-Oriented Approach to Multi-Level Association Rule Mining Fortin et al. (Year: 1996).*

*Primary Examiner* — Kakali Chaki
*Assistant Examiner* — Ababacar Seck
(74) *Attorney, Agent, or Firm* — Alexander G. Jochym (57) ABSTRACT

In an approach to create a rule hierarchy model, a computer receives from a user a set of rules and an association between each rule in the set of rules and a concept of the plurality of concepts in a concept hierarchy. The computer receives set of rules is stored separately from the concept hierarchy. The computer determines a rule hierarchy where a rule of the set of rules is associated with one or more concepts. Furthermore, the computer creates a rule hierarchy model based on the concept hierarchy and the rule hierarchy wherein grouping related rules in a common structure provides efficient management that facilitates rule authoring, browsing, and extraction.

19 Claims, 7 Drawing Sheets

(56) References Cited

U.S. PATENT DOCUMENTS

| | | | |
|---|---|---|---|
| 2009/0125482 A1* | 5/2009 | Peregrine | G06F 17/30864 |
| 2009/0144103 A1* | 6/2009 | Malov | G06Q 30/0206 |
| | | | 705/7.35 |
| 2011/0071857 A1* | 3/2011 | Malov | G06Q 40/06 |
| | | | 705/4 |
| 2013/0110795 A1* | 5/2013 | DeRose | G06F 17/3089 |
| | | | 707/694 |
| 2014/0244241 A1* | 8/2014 | Ghaisas | G06F 17/27 |
| | | | 704/9 |

\* cited by examiner

HIERARCHICAL BUSINESS RULE MODEL

BACKGROUND

The present invention relates generally to the field of business rule management systems, and more particularly to a method for creating a hierarchical business rule model and optimizing a hierarchical business rule model.

A business rule management system (BRMS) is a software system used to define, deploy, execute, monitor, and maintain a variety and a complexity of decision logic that is used by operational systems within an organization or enterprise. A BRMS includes, at least, a repository allowing decision logic to be externalized from core application code, tools allowing both technical developers and business experts to define and manage decision logic, and a runtime environment allowing applications to invoke decision logic managed within the BRMS and execute it using a business rules engine. The decision logic, also referred to as the business rules, includes policies, requirements, and conditional statements that are used to determine the tactical actions that take place in applications and systems. Business rules create an unambiguous statement of how a business uses information to decide a proposition. Using a business rules approach formalizes an enterprise's business rules in a language that both managers and technologists or programmers understand. BRMS allow business experts to define, manage, and deploy an enterprise's operational business as services, available for use by any enterprise application or business process.

SUMMARY

According to one embodiment of the present invention, a method for creating a rule hierarchy model includes one or more computers processors receiving from a user a set of rules and an association between each rule in the set of rules and a concept of the plurality of concepts in a concept hierarchy. The received set of rules is stored separately from the concept hierarchy. The method includes one or more computers processors determining a rule hierarchy where a rule of the set of rules is associated with one or more concepts. Furthermore, the method includes one or more computers processors creating a rule hierarchy model based on the concept hierarchy and the rule hierarchy wherein grouping related rules in a common structure provides efficient management that facilitates rule authoring, browsing, and extraction.

DETAILED DESCRIPTION

Embodiments of the present invention recognize that known solutions for the construction and management of rule hierarchies in existing BRMS rely on a number of platform features such as rule folders, rule properties, overriding relationships, and runtime rule selection, which can make the construction and management of rule hierarchies difficult for business users. Rule properties provide context for the rules, but not a physical rule organization making navigation of the rule hierarchy difficult. Additionally, overriding relationships may be used to filter rules for execution, but need to be carefully re-arranged in a time consuming and error prone process when the rule hierarchy changes.

Embodiments of the present invention provide a method for creating a rule hierarchy model program that uses two main data entities or data structures. The rule hierarchy model program is based on a concept hierarchy and a rule hierarchy as the two main data structures. The first entity or data structure of the rule hierarchical model is a concept hierarchy, which is a collection of business concepts organized as a hierarchical tree structure. The concept hierarchy is developed and defined independently from the rules. Embodiments of the present invention provide a concept hierarchy that can be reusable with one or more rule hierarchies, can provide shared business concepts, and a shared hierarchical structure. The second entity of the hierarchical rule model is a rule hierarchy. The rule hierarchy is a collection or set of rules or rule artifacts that are indexing one or more entries for values or nodes defined in the concept hierarchy. Additionally, grouping related rules grouped in a common structure or rule hierarchy provides efficient rule management and ease of rule authoring, rule browsing, and rule extraction.

The rule hierarchy model described in the embodiments of the present invention separates the concept hierarchy of the business structure from the rule definition or rule hierarchy associated with the concepts in the rule hierarchy model program. Embodiments of the present invention provide a rule hierarchy model program allowing simplified rule management where inserting and removing a rule in the rule hierarchy structure is a straightforward operation. Embodiments of the present invention, additionally, provide dedicated editors using one or more filtering algorithms that can be designed to review the rule hierarchy structure, retrieve lists of rules overridden by another list of rules, and perform batch operations such as deleting or removing a sub-tree of rules, updating, or adding a sub-tree of rules. In various embodiments, the rule hierarchy model optimization occurs at one more of the following operations: during rule hierarchy design by the user, during compilation of the rule hierarchy program (i.e., compiling the program for the rule hierarchy model) and before they are deployed to the rule engine, and at runtime. The rule hierarchy model can be optimized automatically to retain only the required or a minimum number of required rules for execution by the rule engine for the rule hierarchy model program in embodiments of the present invention.

Figure 1:
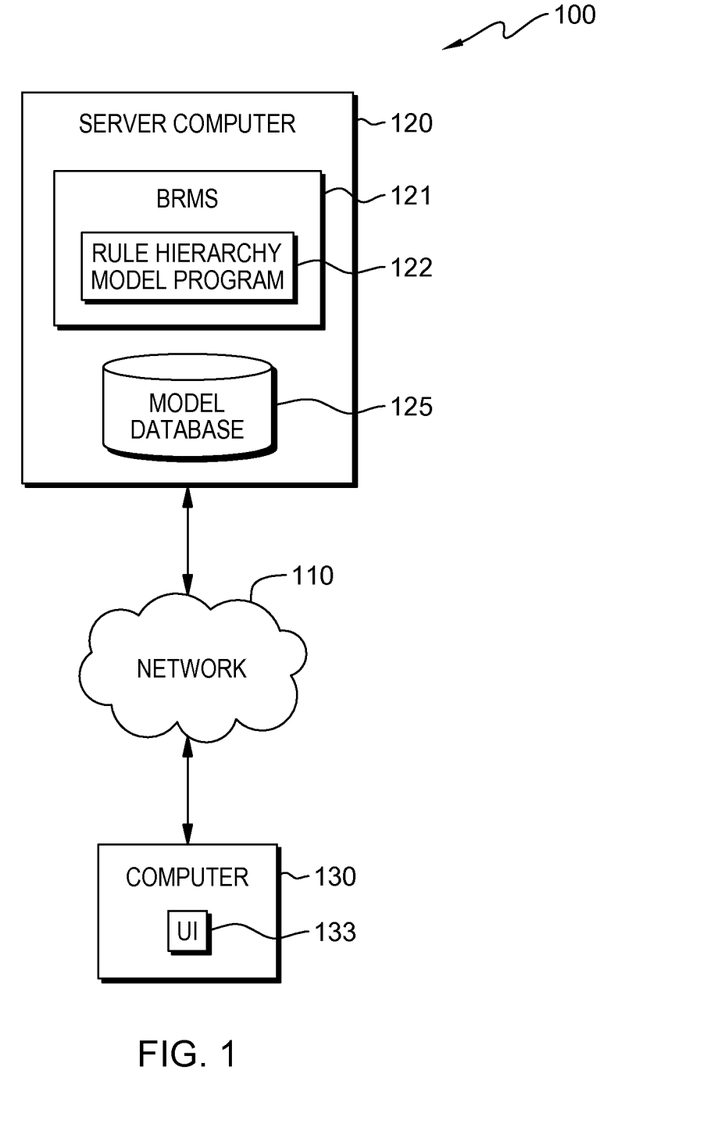
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention.

FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 120, computer 130, and other computing or client devices (not shown) interconnected over network 110. Network 110 can be, for example, a telecommunications network, a local area network (LAN), a wide area network (WAN), such as the Internet, or a combination of the three, and can include wired, wireless, or fiber optic connections. Network 110 can include one or more wired and/or wireless networks that are capable of receiving and transmitting data, voice, and/or video signals, including multimedia signals that include voice, data, and video information. In general, network 110 can be any combination of connections and protocols that will support communications between server computer 120, computer 130, and other computing devices (not shown) within distributed data processing environment 100.

Server computer 120 can be a standalone computing device, a management server computer, a web server computer, a mobile computing device, or any other electronic device or computing system capable of receiving, sending, and processing data. In various embodiments, server computer 120 represents a computing or server computer system utilizing clustered computers and components (e.g., database server computers, application servers, etc.) that act as a single pool of seamless resources such as used in a cloud-computing environment when accessed within distributed data processing environment 100. In another embodiment, server computer 120 can be a laptop computer, a tablet computer, a netbook computer, a personal computer (PC), a desktop computer, a personal digital assistant (PDA), a smart phone, or any programmable electronic device capable of communicating with computer 130, and other computing devices (not shown) within distributed data processing environment 100 via network 110. Server computer 120 may include internal and external hardware components, as depicted and described in further detail with respect to FIG. 5. Server computer 120 includes BRMS 121, rule hierarchy model program 122, and model database 125.

BRMS 121 is a software system to define, deploy, execute, monitor, manage, and maintain the decision logic or business rules used by operational systems or groups within an enterprise to determine actions within the system. As known to one skilled in the art, BRMS 121 may use business rules such as policies, requirements, or conditional statements and take into account rules, which may result in different results for a data element based on the location of the data element in a hierarchical rules classification. For example, the geographical location from which a data element such as a transaction is occurring (e.g., purchasing insurance in Nevada) or the position of an employee in company organization chart (e.g., data that must have management title to be viewed). In various embodiments, BRMS 121 allows business experts to define, manage, and deploy an enterprises business decisions as services available for use by any enterprise or business process. BRMS 121 utilizes rule hierarchies or sets of rules. The definition of the rule hierarchies is associated to and may depend on a hierarchical concept that is a part of the context of the data (i.e., payload) on which the rules apply. In BRMS 121, the expected runtime behavior for a rule hierarchy is that for a given rule hierarchy, only one rule from the hierarchy is selected and applied and that the selected rule is associated with the hierarchical concept that is the same as the data (i.e., payload) or the closest ancestor of the hierarchical concept for the data. BRMS 121 is depicted on server computer 120, however in other embodiments; BRMS 121 may reside on another server computer, another computing device, or on several server computers or computing devices. BRMS 121 hosts rule hierarchy model program 122. In one embodiment, the routines and codes of rule hierarchy model program 122 are included in the routines and code of BRMS 121. In an embodiment, BRMS 121 retrieves and stores data such as rule hierarchies, concept hierarchies, and rule hierarchy models in model database 125. BRMS 121 receives and sends information and data such as rule hierarchy models, rule hierarchies, concept hierarchies, and selected rules to a user on computer 130 via network 110. In another embodiment, BRMS 121 includes model database 125.

Rule hierarchy model program 122 resides in BRMS 121 on server computer 120. Rule hierarchy model program 122 creates a rule hierarchy model. Rule hierarchy model program 122 receives from a user operating via user interface ("UI") 133 user input or data for constructing a concept hierarchy and a rule hierarchy and the associations between the concept hierarchy and the rule hierarchy used in the constructing the rule hierarchy model. In various embodiments, rule hierarchy model program 122 receives via network 110 natural language input or data from the user on UI 133 for the construction of a concept hierarchy and a rule hierarchy. The user on computer 130 also provides data and information on the relationships and associations between the concepts in the concept hierarchy and the rules within the rule hierarchy. Rule hierarchy model program 122 creates a rule hierarchy model utilizing the user provided concept hierarchy, the rule hierarchy and the relationships or association between the rules and the concepts hierarchy. In various embodiments, the rule hierarchy model is created by indexing a rule or node in the rule hierarchy to one or more concepts or nodes in the concept hierarchy where the associations or relationships between the rules and the concepts are provided by a user via one or more input methods (e.g., voice, touch screen, keyboard, or links).

Rule hierarchy model program 122 allows for insertion or deletion of rules or performing batch operations such as deletion of a sub-tree or branch of rules in the rule hierarchy. The rule hierarchy utilized by rule hierarchy model program 122 allows overriding of rules. Additionally, in various embodiments, rule hierarchy model program 122 provides the ability to optimize the rules hierarchy model to maintain only the essential or minimum required rules. For example, at runtime or compile, rule hierarchy model program 122 optimizes the rule hierarchy model using various techniques such as eliminating unnecessary equivalent rules (e.g., eliminating rules with rule equivalence). In various embodiments, rule hierarchy model program 122 after runtime, compiles natural language user input for the concept hierarchy, the rules hierarchy along with the indexing or user specified associations between the concept hierarchy and the rule hierarchy into executable code for a rule hierarchy model. In an embodiment, rule hierarchy model program 122 resides on computer 130, or on one or more computing devices (not shown) in distributed data processing environment 100.

Computer 130 is a client to server computer 120. Computer 130 may be a notebook, a laptop, a personal digital assistant, a tablet, a smart phone, wearable computing device, or other computing system connected to server computer 120 via network 110. Computer 130 sends and receives data and information such as user inputs for concept hierarchies, rule hierarchies, the relationships or linkages (e.g., indexing) between the concepts (e.g., nodes) in the concept hierarchy and the rules (e.g., nodes) in the rules hierarchy in addition to sending any queries or requests for information from BRMS 121 or from rule hierarchy model program 122. Computer 130 may receive, display, or send on UI 133 data or user input on concepts for creating a concept hierarchy and rules such as constraints, restrictions, or policies used in creating a rules hierarchy, in addition to related business queries, in natural language from the user. Computer 130 includes software applications and/or known programming code that supports voice recognition. Computer 130 may send and receive data from model database 125 on server computer 120. Computer 130 may send and receive data from other computing devices (not shown). While computer 130 is depicted as a single client device, multiple computing devices or client devices may communicate and exchange data with BRMS 121 and rule hierarchy model program 122 via network 110. In general, computer 130 represents any programmable electronic device or combination of programmable electronic devices capable of executing machine readable program instructions and communicating with server computer 120 and other computing devices (not shown) within distributed data processing environment 100 via network 110. While computer 130 is depicted as a single client device, computer 130 may be multiple computing devices or client devices used to communicate and exchange data with rule hierarchy model program 122 and model database 125 on server computer 120 via network 110.

UI 133 on computer 130 is a user interface providing an interface between a user of computer 130 and server computer 120, and enables a user of computer 130 to interact with programs and data on server computer 120, computer 130, and other computing devices (not shown). UI 133 may be a graphical user interface (GUI), an active area or line for text inputs, a web user interface (WUI), or other type of user interface and can display text, documents, user options, application interfaces, and instructions for operation such as queries, and include the information that a program present to a user. In an embodiment, UI 133 receives a user input via a voice, a touch screen, a key board, a mouse, a display, an audio, visual or motion sensing device or other peripheral device standard in computer devices. UI 133 may be used by a user to receive information for the creation or alterations of a concept hierarchy and a rule hierarchy for a rule model to be created by rule hierarchy model program 122. UI 133 may receive and display to the user rule models and/or query results from rule hierarchy model program 122, model database 125, or BRMS 121.

Figure 2:
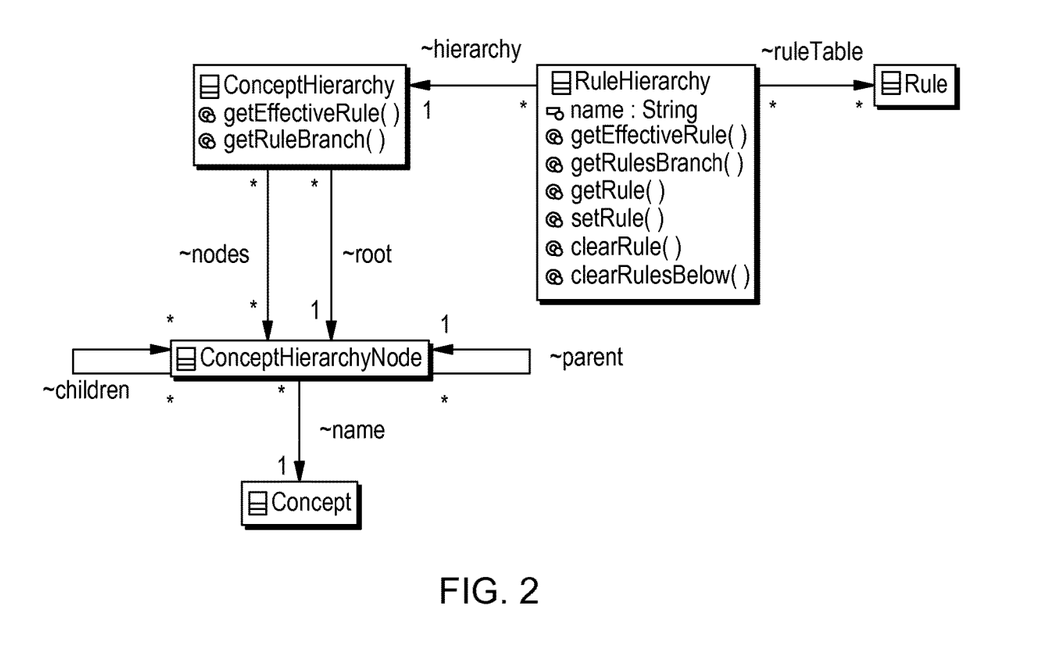
FIG. 2 is an example of a unified modeling language class diagram for a rule hierarchy model program using a concept hierarchy and a rule hierarchy, in accordance with an embodiment of the present invention.

FIG. 2 is an example of a unified modeling language (UML) class diagram for a rule hierarchical model created from rule hierarchy model program 122 in accordance with an embodiment of the present invention. UML language is a standard visual modelling language for use in modelling business processes and similar processes. UML class diagrams are visual representations of the structure and composition of a particular system using the conventions determined in UML. In a UML class diagram, in the definition of a class (e.g., node), the class can be associated to itself; the parent of a node is itself a node, and children of a node are also nodes. The UML class diagram in FIG. 2 depicts two data structures for the creation of a rule hierarchy model. As illustrated in FIG. 2, a rule hierarchy is related to a rule table where multiple instances (denoted by * in UML class diagrams) of rule hierarchies may occur for multiple instances of rules. The rule hierarchy identified by a name (e.g., string) can perform the operations depicted under the name (e.g., getEffectiveRule, getRuleBranch, etc.). The rule hierarchy is related to a concept hierarchy where one concept hierarchy (denoted by 1 in UML class diagrams) can be related to multiple instances of a rule hierarchy. The concept hierarchy may have multiple nodes for concept hierarchy nodes but, only one root related to the concept hierarchy node where multiple children may exist in a reflexive association for each concept hierarchy node and one parent may be reflexively associated in multiple instances for the concept hierarchy node where each concept hierarchy node may be related to a single concept.

Figure 3:
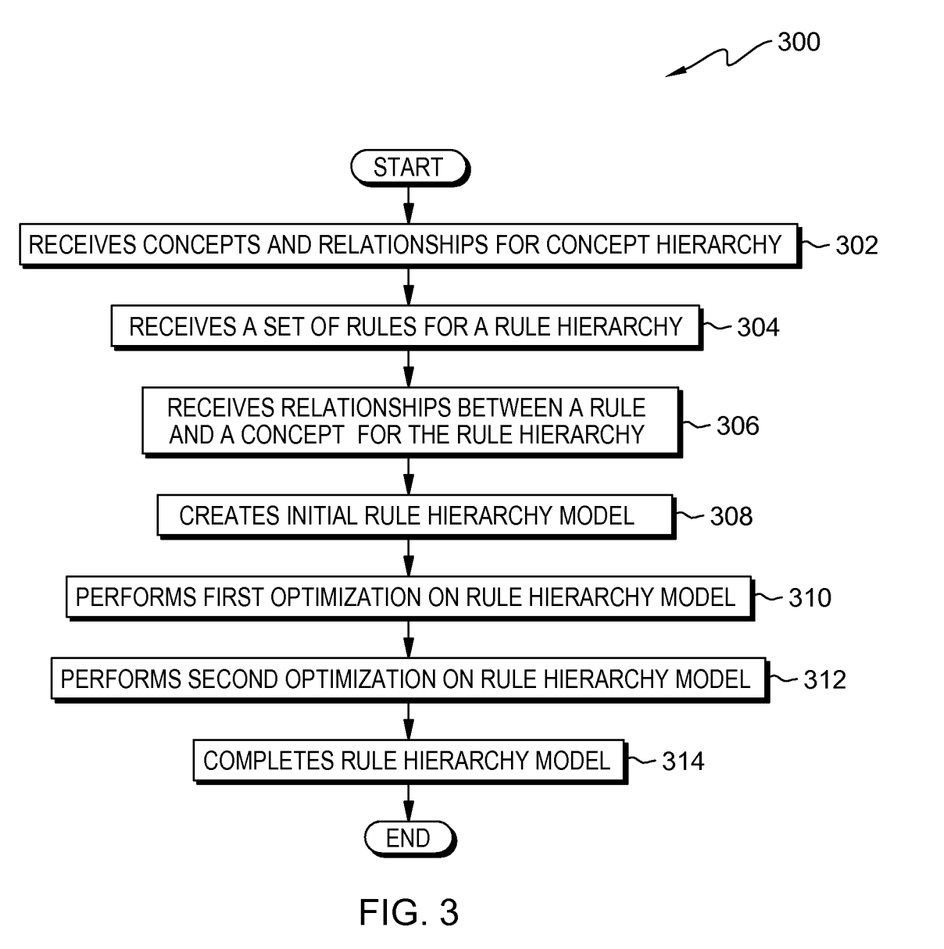
FIG. 3 is a flowchart depicting operational steps for a method to create a rule hierarchy model program, on a server computer within the data processing environment of FIG. 1, for creating a rule hierarchy model for a set of rules, in accordance with an embodiment of the present invention.
Figure 4A:
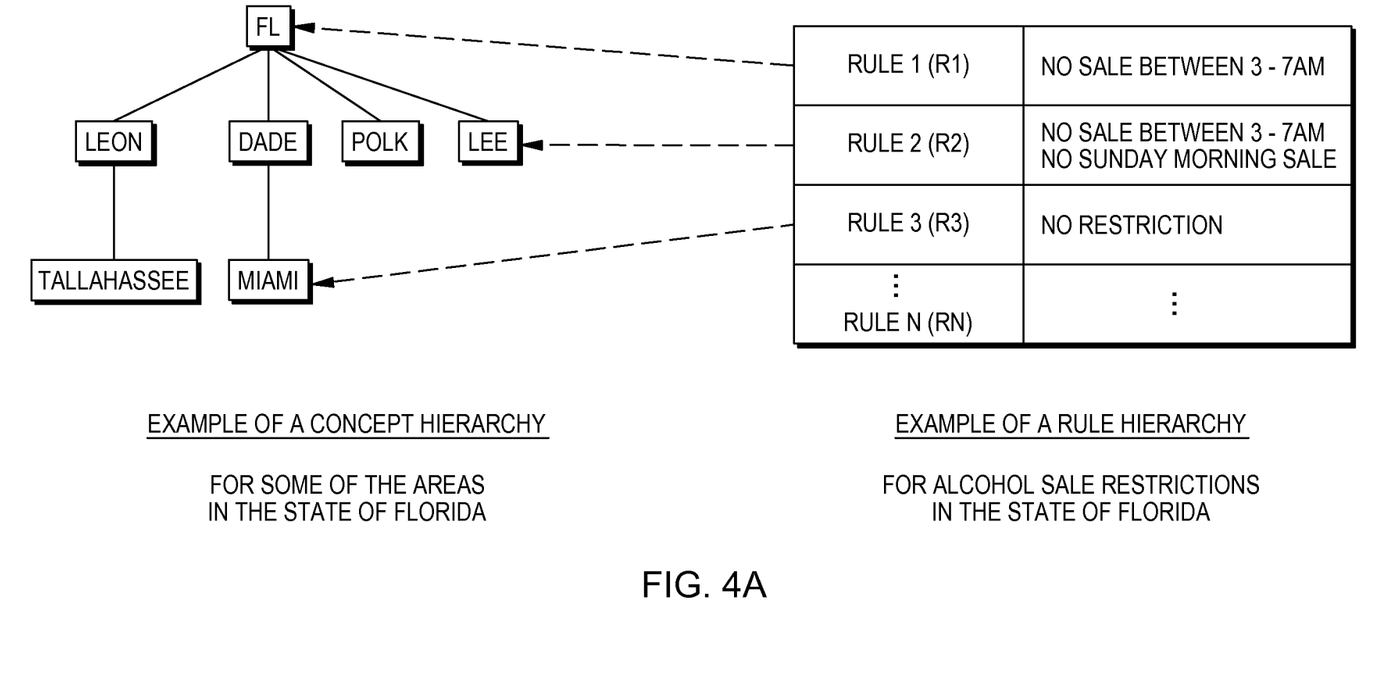
FIG. 4A is an example of a rule hierarchy and a concept hierarchy, in accordance with an embodiment of the present invention.

FIG. 3 is flowchart 300 depicting operational steps of rule hierarchy model program 122, on a server computer 120 within the data processing environment of FIG. 1, for creating a rule hierarchy model for a set of rules, in accordance with an embodiment of the present invention. Rule hierarchy model program 122 receives concepts and relationships for a concept hierarchy (302) from a user on computer 130. In an embodiment, the user inputs to UI 133 using natural language the various elements or concepts for nodes in the concept hierarchy and the relationships and associations between the concepts or nodes for creating a concept hierarchy used by an enterprise or organization. In another embodiment, the user imports the concept hierarchy from an enterprise reference data repository or database. For example, an organization chart may be imported from an organization or a product line-up or hierarchy for an enterprise may be imported for a concept hierarchy. The concept hierarchy may be based, for example, on a hierarchical structure for a geography, an organizational structure (e.g., an organization chart), or a product line or product category. A concept hierarchy, for example as depicted in FIG. 4A, may be a geographical representation of the enterprise or organization hierarchy, in this example the geographical organizational structure is based on some areas of the state of Florida. As depicted in FIG. 4A, the concept hierarchy for the state of Florida includes some geographic relationships between the state, county, and cities. As depicted in FIG. 4A, the concept hierarchy is used with a rule hierarchy corresponding to alcohol sales. The concept hierarchy illustrated (in a partial or an abbreviated form in FIG. 4A) for the state of Florida may be re-usable with another rule hierarchy such as with a rule restriction hierarchy for cigarette sales in Florida or for property tax regulations in Florida, for example.

In various embodiments, rule hierarchy model program 122 on server computer 120 receives from the user via UI 133 and network 110, the elements or concepts (e.g., nodes), the relationships, and the associations between the concepts or nodes used to create a concept hierarchy using a hierarchical tree structure for the data. A hierarchical tree structure or data structure for simulating a hierarchical tree structure is a collection of nodes representing values for the concepts starting at a root node. The tree data structure may be defined where each node is a data structure consisting of a value with a list of references to nodes (i.e., children or child nodes), for example.

As known to one skilled in the art, a node is a structure that may contain a value, a condition, or a separate data structure (e.g., may be a tree). Each node has zero or more child nodes (i.e., children) below it in the tree. A node with at least one child below it is a parent node and only one parent node exists for each child node. The originating or top node in the tree is the root. A node without children is a leaf and a sub-tree corresponds to the node and each of the node's descendants (i.e., nodes connected below a node in the tree). In one embodiment, the values or nodes are input in a software code to create the concept hierarchy.

Upon receiving from the user an indication that the input for the concept hierarchy is complete (e.g., a verbal input, a keyboard or mouse input), rule hierarchy model program 122 creates the concept hierarchy for the received user inputs on the concepts (e.g., nodes or values) and the relationships between them. In various embodiment, rule hierarchy model program 122 creates the concept hierarchy using methods known to one skilled in the art. The concept hierarchy is sent to model database 125 for storage, possible edits, and re-use in other potential rule hierarchy models.

In various embodiments, rule hierarchy model program 122 receives a set of rules for a rule hierarchy (304) from a user input on UI 133. In various embodiments, a plurality of rules are sent by computer 130 via network 110 to rule hierarchy model program 122 on server computer 120. In an embodiment, rule hierarchy model program 122 receives the rules in a set of rules that are in a rules table. The user inputs via voice (e.g., natural language) or other known input method (e.g., keyboard and/or touchscreen) on UI 133 to rule hierarchy model program 122 in BRMS 121 the various rules such as conditions, restrictions, or policies for the values or nodes in a rule hierarchy. For example, as depicted in FIG. 4A, a rule from the set of rules for the state of Florida prohibits alcohol sales between the hours of 3 am and 7 am. The set of rules is stored in a repository, for example in model database 125 or in another database, independent of the concept hierarchy.

Rule hierarchy model program 122 receives relationships between a rule and a concept for a rule hierarchy (306) from the user via UI 133. In various embodiments, a rule hierarchy is represented by a rule table that associates the concepts from the concept hierarchy with rules. A rule hierarchy connects existing rules to existing concepts from the concept hierarchy, and records the association in the rule table. For example, a rule hierarchy is created using an empty rule table and an existing concept hierarchy. Each element or row of the rule table is a pair (i.e., a row with 2 cells) of the form <rule, associated concept> indicating a relationship between the rule and the concept received from a user. Rule hierarchy model program 122 receives the input for the relationships indicating the rule and the associated concept from the user on UI 133. Rule hierarchy model program 122 progressively adds new <rule, associated concept> pairs according to received user input until the rule hierarchy is complete.

The rule hierarchy indexes rules to concepts in a hierarchical model according to the user supplied relationships for associations. The dashed lines drawn between rules (e.g., nodes) in the rule hierarchy and the associated concepts in the concept hierarchy in FIG. 4A illustrate indexing between the rules and concepts in a rule hierarchy. The user provides associations or relationships for indexing rules to related concepts (e.g., nodes) in the concept hierarchy, which are indicated by lines between the rule (e.g., node) and a related concept (e.g., node) for a value or element representing a geographical area (e.g., state, county, or city) in the concept hierarchy depicted in FIG. 4A. In an embodiment, a concept hierarchy is re-used with a different rule hierarchy. For example, the concept hierarchy for the state of Florida depicted in FIG. 4A may be used with a rule hierarchy created for age restrictions on tobacco sales or for example, with a rule hierarchy created for county and local sales taxes in Florida.

A rule (e.g., node) in a hierarchical model created using rule hierarchy model program 122 is associated with one or more concepts in the concept hierarchy. For example, as depicted in FIG. 4A, Rule 1 (R1) for no sale of alcohol between 3 am and 7 am in the state of Florida applies to Polk, Leon, and Dade counties. In various embodiments, rule hierarchy model program 122 associates a concept with zero to one rule in a rule hierarchy where the associations are provided through user input on UI 133 sent via network 110.

The user indicates via a verbal or another user interface input (e.g., an entry via a keyboard or touch screen) that the inputs for the rule hierarchy are complete, and rule hierarchy model program 122 creates the initial rule hierarchy for the received set of rules. The rule hierarchy is sent by computer 130 to rule hierarchy model program 122 on server computer 120 and to model database 125.

Figure 4B:
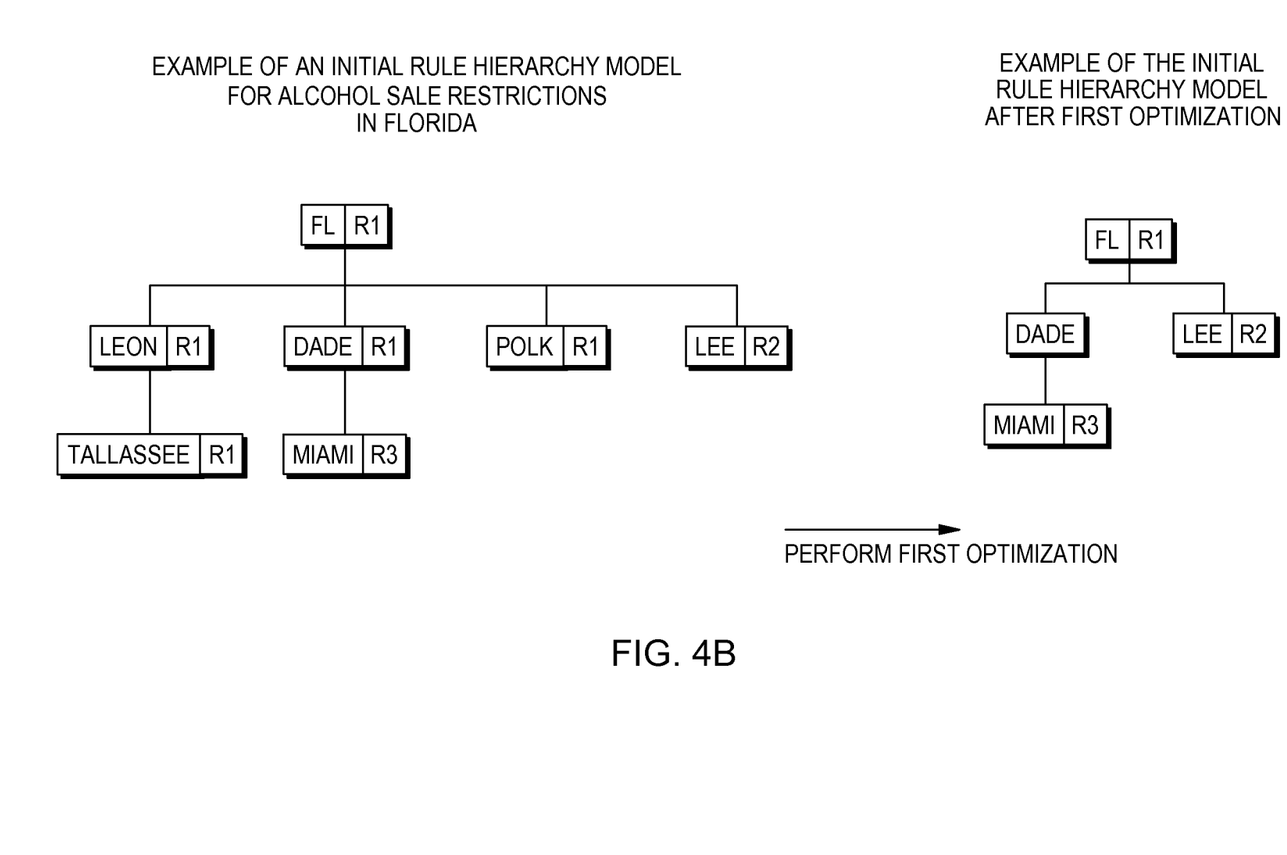
FIG. 4B is an example of a first optimization on an initial rule hierarchy model, in accordance with an embodiment of the present invention.

After receiving the previously defined concept hierarchy and organizing the rules into a separate data structure for a rule hierarchy by creating the associations for the rules to one or more concepts in the concept hierarchy according to provided user input, rule hierarchy model program 122 creates an initial rule hierarchy model (308). An example of an initial rule hierarchy model for alcohol sales in Florida is depicted in FIG. 4B based on user input for associations between examples of a rule hierarchy and a concept hierarchy depicted in FIG. 4A.

The basic operations that may be performed on the rule hierarchy model in various embodiments of the present invention include: associating or adding a rule to a given concept, removing a rule associated with a given concept, removing the rules (or sub-tree) associated to the concepts below a given concept, retrieving the rule that effectively applies or is associated to a given concept, and retrieving the ancestor rules (or branch) for a given concept. Using the two data structures for a rule hierarchy and concept hierarchy, the resulting structures and the operations that may be performed on the structures provide easier creation and management of rule hierarchies where rules may be more easily added or deleted from rule hierarchies.

Additionally, in various embodiments, dedicated editors review the rule hierarchy to retrieve which list of rules is overridden by another list of rules, and perform batch operations such as deleting an entire sub-tree of rules. For example, in a banking enterprise providing mortgages to first time homebuyers, the minimum credit score for a first time buyer to receive a mortgage is raised from 650 to 700 for California. The editor traverses the rule hierarchy using rule hierarchy model program 122 to clear rules associated in a rule hierarchy model below California that use a minimum credit score of 650 for first time buyers, and re-sets the rules to a minimum credit score of 700. When a rule hierarchy is defined and the initial rule hierarchy model is created, rule hierarchy model program 122 performs a first optimization on the rule hierarchy model (310).

In various embodiments, the first optimization performed automatically simplifies (e.g., trims redundant rules) or optimizes the set of rules in the rule hierarchy to retain only a minimum number of rules for execution by the rule engine. In one embodiment, the first optimization occurs at runtime. In other embodiments, the first optimization occurs at one or more of: during rule hierarchy design by the user and compile time. For example, the first optimization may occur when the rules are compiled into executable code, and before the rules are deployed to the rule engine. The first optimization occurs when a child rule associated to a concept in the initial rule hierarchy model is equivalent to the rule associated with the rule's parent concept (e.g., the rule associated with the parent rule above the child rule), and then the child rule is ignored. In various embodiments, the simplification of the initial hierarchical rule model utilizes a breadth-first recursion starting with the leaves on the rule hierarchy that are a created using a tree structure within the initial hierarchical rule model. A breadth-first recursion on a tree structure traverses the tree in the level order or by searching every node on a level before going to a lower level (e.g., searching the breadth or broadening a search rather than increasing the "depth" of a search of a structure). For example, FIG. 4B depicts the result of a breadth first recursion on the initial rule hierarchy model for Florida Alcohol Sales depicted in FIG. 4B. In the initial hierarchical rule model, the child rules for the counties of Leon, Dade, and Polk are equivalent to the parent concept's rules or that is, the rules have the same conditions and the same restrictions (i.e. Florida state rules (R1) for alcohol sales restriction). The equivalent County or children rule associations are trimmed (e.g., removed) simplifying the rule hierarchy and the resulting rule hierarchy model after first optimization. Similarly, the rules for Tallahassee, which are the same as the parent rules for Leon County (i.e., Florida state rules (R1) for alcohol sales restriction) are also trimmed from the rule hierarchy. The rule hierarchy model after first optimization in this example deploys three rules instead of the original seven rules in the initial rule hierarchy model in FIG. 4B.

In various embodiments, rule hierarchy model program 122 performs a second optimization on the rule hierarchy model (312). The second optimization further simplifies or optimizes the rule hierarchy model by consolidating concepts or nodes in the concept hierarchy that are not associated with a rule in the rule hierarchy. In various embodiments, for each of the nodes in the concept hierarchy not associated with a rule in the rule hierarchy of the rule hierarchy model, the following optimization is applied using breadth first recursion on the rule hierarchy model starting with the leaves on the hierarchical tree structure of the rule hierarchy model. First, apply the second optimization if there is a set of child nodes in the concept hierarchy associated with equivalent rules and this set of children nodes is larger than the rest of the children nodes, then: (1.) ignore the children associated with the equivalent rules and associate one of the equivalent rules to the parent node in the concept hierarchy; and (2.) for each child node in the concept hierarchy not associated with a rule, associate the concept to the first applicable rule from the node's ancestors. In various embodiments, the first and the second optimizations occur automatically at one or more of the following times: at runtime, at rule hierarchy design, and when the rule hierarchy model is compiled (e.g., before the rules are deployed to the execution environment). For example, the first and second optimization processes as depicted and discussed in FIGS. 4B and 4C can be applied automatically during the compilation process to simply the rule hierarchy model before the model is deployed to the rule engine.

Figure 4C:
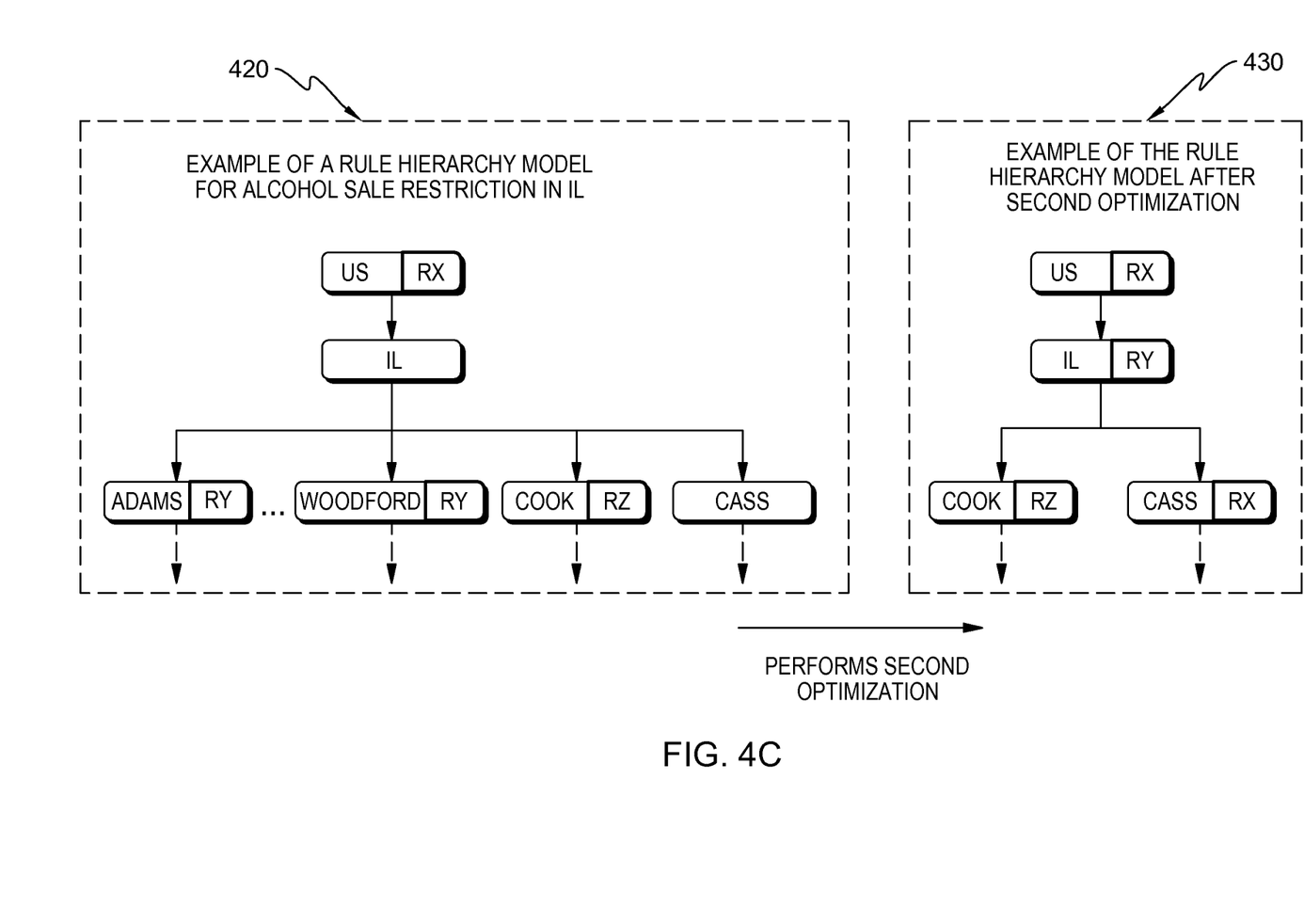
FIG. 4C is an example of a second optimization on a rule hierarchy model, in accordance with an embodiment of the present invention.

An example of a second optimization on a rules hierarchy model for alcohol sales restrictions for the state of Illinois (IL) is depicted in FIG. 4C. Rule hierarchy model 420 illustrates an example of the rule hierarchy model before the second optimization. As depicted in FIG. 4C, concept nodes for Illinois (IL) and Cass County have no rules associated with them. A set of children nodes for Illinois are associated with equivalent rules (i.e., Ry) and the set of children nodes for the equivalent rule (Ry) is larger than the rest of the children nodes (Rz for Cook County). Therefore, in the second optimization in FIG. 4C, the equivalent rules for the children nodes for Adams through Woodford counties may be ignored and one of the equivalent rules (e.g., Adams County rule or Ry) is associated with the parent node originally without an associated rule. Additionally, the child node in the concept hierarchy without an associated rule, i.e., Cass County is associated with the first applicable rule, in this case, US rule Rx for no alcohol sale restrictions. The second optimization of the depicted rule hierarchy model 420 depicted in FIG. 4C results in a simplified rule hierarchy model 430.

Rule hierarchy model program 122 completes the rule hierarchy model (314). Rule hierarchy model program 122 compiles the optimized rule hierarchy model. The optimized rule hierarchy and concept hierarchy created from user inputs, for example in natural language, are compiled into executable code by rule hierarchy model program 122 for the rule hierarchy model. In various embodiments, the rule hierarchy model is used in decision processes in a business. For example, the rule hierarchy model is used to generate business decisions. The rule model depicted in FIG. 4B may be used to determine store locations in Florida providing the most time for the sale of alcohol, for example.

FIG. 4A is an example of a rule hierarchy for alcohol sales restrictions and a concept hierarchy representing some areas in the state of Florida, in accordance with an embodiment of the present invention. As depicted, FIG. 4A includes an example of a concept hierarchy for some geographical regions of the state of Florida, an example of rules relating to the restriction of alcohol sales by some geographical regions (e.g., county and/or city) in the state of Florida, and dashed lines between the rules and the associated concepts in the concept hierarchy. The dashed line for Rule 1 to FL relates Rule 1 to FL and the children of FL unless otherwise specified as is the case for Lee County (e.g., Rule 2) and Miami (Rule 3). The dashed lines indicating relationships or associations between a rule and one or more concepts in the concept hierarchy are used to create a rule hierarchy for a rule hierarchy model depicted in FIG. 4B.

FIG. 4B is an example of a first optimization on an initial rule hierarchy model for alcohol sales restrictions in the state of Florida, in accordance with an embodiment of the present invention. As depicted, FIG. 4B includes an example of an initial rule hierarchy model and an example of the initial rule hierarchy model after a first optimization.

FIG. 4C is an example of a second optimization on a rule hierarchy model for alcohol sales restrictions in the state of Illinois, in accordance with an embodiment of the present invention. As depicted, FIG. 4C illustrates one example of a rule hierarchy model for alcohol sales restrictions in the state of Illinois and the rule hierarchy model after rule hierarchy model program 122 performs a second optimization. The further discussion of FIGS. 4A-C are included above in reference to the steps of FIG. 3.

Figure 5:
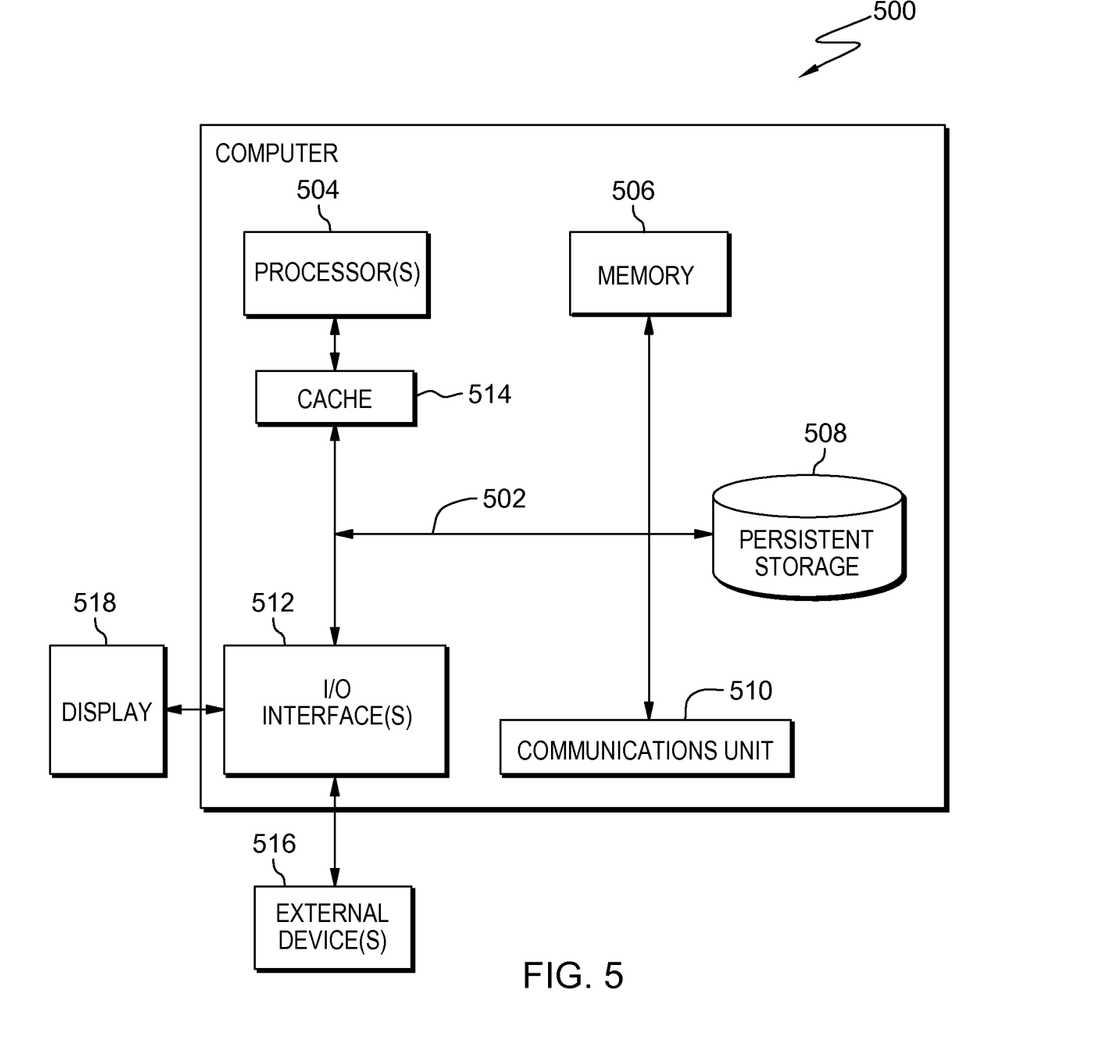
FIG. 5 depicts a block diagram of components of server computer 120 in accordance with an illustrative embodiment of the present invention.

FIG. 5 depicts block diagram 500 of components of server computer 120 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computer 120 includes communications fabric 502, which provides communications between cache 514, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of computer processor(s) 505 by holding recently accessed data, and data near accessed data, from memory 506.

Rule hierarchy model program 122 may be stored in persistent storage 508 and in memory 506 for execution by one or more of the respective computer processors 504 via cache 514. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Rule hierarchy model program 122 may be downloaded to persistent storage 508 through communications unit 510.

I/O interface(s) 512 allows for input and output of data with other devices that may be connected to server computer 120. For example, I/O interface 512 may provide a connection to external devices 516 such as a keyboard, keypad, a touch screen, and/or some other suitable input device. External devices 516 can also include portable computer readable storage media such as, for example, thumb drives, portable optical or magnetic disks, and memory cards. Software and data used to practice embodiments of the present invention, e.g., rule hierarchy model program 122 can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application, or technical improvement over technologies found in the marketplace, or to enable others of ordinary skill in the art to understand the embodiments disclosed herein.

What is claimed is:

1. A method, the method comprising:
   receiving, by one or more computer processors, from a user a set of rules and a plurality of concepts in a concept hierarchy wherein the set of rules is stored separately from the concept hierarchy;
   receiving, by one or more computer processors, an association between each rule in the set of rules and one or more concepts of the plurality of concepts in the concept hierarchy to determine an initial rule hierarchy model where each rule of the set of rules is associated with one or more concepts;
   performing, by one or more computer processors, a first optimization of the initial rule hierarchy model by eliminating one or more rules in the initial rule hierarchy model with rule equivalence, wherein the first optimization occurs automatically during a compilation process;
   performing, by one or more computer processors, a second optimization after the first optimization on the initial rule hierarchy model wherein the second optimization consolidates one or more concepts in the concept hierarchy according to a set of second optimization steps, wherein the second optimization occurs automatically during the compilation process; and
   creating, by one or more computer processors, a rule hierarchy model based on the initial rule hierarchy model, the first optimization on the initial rule hierarchy model, and the second optimization after the first optimization of the initial rule hierarchy.

2. The method of claim 1 further comprising:
   providing, by one or more computer processors, an ability to insert and to remove one or more rules of the set of rules in the rule hierarchy; and
   providing, by one or more computer processors, an ability to retrieve a list of rules overridden by another list of rules and perform batch operations on the rule hierarchy model wherein the batch operations include one or more of removing a sub-tree of rules, updating a sub-tree of rules and adding a sub-tree of rules.

3. The method of claim 1, wherein the first optimization and the second optimization optimize the rule hierarchy model to maintain a minimum number of required rules.

4. The method of claim 1, wherein the first optimization and the second optimization occur at one or more of: at runtime, when compiling the program for a rule hierarchy model, and during rule hierarchy model design.

5. The method of claim 1, wherein the first optimization applies a breadth first recursion of the rule hierarchy model starting with at least one leaf of the rule hierarchy model that is a hierarchical tree structure.

6. The method of claim 1, wherein the concept hierarchy is re-usable with one or more rule hierarchies.

7. The method of claim 1, wherein the first optimization of the initial rule hierarchy model steps comprises:
   determining, by one or more computer processors, whether a rule associated to a child concept in the initial rule hierarchy is equivalent to a rule associated with a parent concept in the initial rule hierarchy model; and responsive to determining the rule associated to the child concept in the initial rule hierarchy is equivalent to the rule associated with the parent concept in the initial rule hierarchy model, eliminating the rule associated the child concept that is equivalent to the rule associated with the parent concept in the initial rule hierarchy model to consolidate the initial rule hierarchy model.

8. The method of claim 1, wherein the set of second optimization steps comprises:
  determining, by one or more computer processors, whether a child node in the rule hierarchy model is associated with one or more equivalent rules in the rule hierarchy model, wherein a child node is a concept of the plurality of concepts in the concept hierarchy;
  responsive to determining that the child node in the concept hierarchy are associated with the one or more equivalent rules in the rule hierarchy model, ignore, by one or more computer processors, the child node associated with the one or more equivalent rules and associate the one or more equivalent rules with a parent node of the plurality of concepts in the concept hierarchy; and
  associating, by one or more computer processors, a rule from a first ancestor node of the rule hierarchy model that completed the first optimization of the initial rule hierarchy model to each child node not associated with a rule in the rule hierarchy model after the first optimization.

9. A computer program product, the computer program product comprising:
  one or more computer readable storage media and program instructions stored on the one or more computer readable storage media, the program instructions executable by a processor, the program instructions comprising:
  program instructions to receive from a user a set of rules and a plurality of concepts in a concept hierarchy wherein the set of rules is stored separately from the concept hierarchy;
  program instructions to receive an association between each rule in the set of rules and one or more concepts of the plurality of concepts in the concept hierarchy to determine an initial rule hierarchy model where each rule of the set of rules is associated with one or more concepts;
  program instructions to perform a first optimization of the initial rule hierarchy model by eliminating one or more rules in the initial rule hierarchy model with rule equivalence, wherein the first optimization occurs automatically during a compilation process;
  program instructions to perform a second optimization after the first optimization on the initial rule hierarchy model wherein the second optimization consolidates one or more concepts in the concept hierarchy according to a set of second optimization steps, wherein the second optimization occurs automatically during the compilation process; and
  program instructions to create a rule hierarchy model based on the initial rule hierarchy model, the first optimization on the initial rule hierarchy model, and the second optimization after the first optimization of the initial rule hierarchy.

10. The computer program product of claim 9, further comprising:
  program instructions to provide an ability to insert and to remove one or more rules of the set of rules in the rule hierarchy; and
  program instructions to provide an ability to retrieve a list of rules overridden by another list of rules and perform batch operations on the rule hierarchy model wherein the batch operations include one or more of removing a sub-tree of rules, updating a sub-tree of rules and adding a sub-tree of rules.

11. The computer program product of claim 9, further comprises program instructions to performing a second optimization on the rule hierarchy model wherein the first optimization and the second optimization optimize the rule hierarchy model to maintain a minimum number of required rules.

12. The computer program product of claim 9, wherein the first optimization and the second optimization occur at one or more of: at runtime, when compiling the program for a rule hierarchy model, and during rule hierarchy model design.

13. The computer program product of claim 9, wherein the first optimization applies a breadth first recursion of the rule hierarchy model starting with at least one leaf of the rule hierarchy model that is a hierarchical tree structure.

14. The computer program product of claim 9, wherein the concept hierarchy is re-usable with one or more rule hierarchies.

15. A computer system, the computer system comprising:
  one or more computer processors;
  one or more computer readable storage media;
  program instructions stored on the one or more computer readable storage media for execution by at least one of the one or more processors, the program instructions comprising:
  program instructions to receive from a user a set of rules and a plurality of concepts in a concept hierarchy wherein the set of rules is stored separately from the concept hierarchy;
  program instructions to receive an association between each rule in the set of rules and one or more concepts of the plurality of concepts in the concept hierarchy to determine an initial rule hierarchy model where each rule of the set of rules is associated with one or more concepts;
  program instructions to perform a first optimization of the initial rule hierarchy model by eliminating one or more rules in the initial rule hierarchy model with rule equivalence, wherein the first optimization occurs automatically during a compilation process;
  program instructions to perform a second optimization after the first optimization on the initial rule hierarchy model wherein the second optimization consolidates one or more concepts in the concept hierarchy according to a set of second optimization steps, wherein the second optimization occurs automatically during the compilation process; and
  program instructions to create a rule hierarchy model based on the initial rule hierarchy model, the first optimization on the initial rule hierarchy model, and the second optimization after the first optimization of the initial rule hierarchy model.

16. The computer system of claim 15, further comprising:
  program instructions to provide an ability to insert and to remove one or more rules of the set of rules in the rule hierarchy; and
  program instructions to provide an ability to retrieve a list of rules overridden by another list of rules and perform batch operations on the rule hierarchy model wherein the batch operations include one or more of removing a sub-tree of rules, updating a sub-tree of rules and adding a sub-tree of rules.

17. The computer system of claim 15, further comprises program instructions to performing a second optimization on the rule hierarchy model wherein the first optimization and the second optimization optimize the rule hierarchy model to maintain a minimum number of required rules.

18. The computer system of claim 15, wherein the first optimization and the second optimization occur at one or more of: at runtime, when compiling the program for a rule hierarchy model, and during rule hierarchy model design.

19. The computer system of claim 15, wherein the concept hierarchy is re-usable with one or more rule hierarchies.

* * * * *